United States Patent [19]
Ward et al.

[11] Patent Number: 5,503,689
[45] Date of Patent: Apr. 2, 1996

[54] GENERAL PURPOSE ALUMINUM ALLOY SHEET COMPOSITION, METHOD OF MAKING AND PRODUCTS THEREFROM

[75] Inventors: Bennie R. Ward, Richmond, Va.; Stanley M. Boyd, Louisville, Ky.; James P. Martin, Powhatan, Va.

[73] Assignee: Reynolds Metals Company, Richmond, Va.

[21] Appl. No.: 225,485

[22] Filed: Apr. 8, 1994

[51] Int. Cl.$^6$ .................................................. C22F 1/04
[52] U.S. Cl. .................... 148/549; 148/551; 148/552; 148/695; 148/437; 164/479; 164/480
[58] Field of Search ..................... 148/549, 551, 148/552, 695, 437, 438, 439; 420/534, 535, 537, 538, 544, 546, 547, 553; 164/479, 480

[56] References Cited

U.S. PATENT DOCUMENTS

| | | | |
|---|---|---|---|
| 2,811,439 | 10/1957 | Cooper | 420/537 |
| 2,956,846 | 10/1960 | McCullough | 420/538 |
| 3,359,141 | 12/1967 | Mercier | 420/537 |
| 3,576,832 | 4/1971 | Becker et al. | 420/538 |
| 3,818,566 | 6/1974 | Anderson et al. | 420/537 |
| 4,026,141 | 6/1977 | Chia et al. | 148/437 |
| 4,828,012 | 5/1989 | Honeycutt, III et al. | 164/479 |
| 4,929,421 | 5/1990 | Jin et al. | 420/545 |
| 5,186,235 | 2/1993 | Ward, Jr. | 148/552 |
| 5,217,547 | 6/1993 | Ishikawa et al. | 148/552 |

*Primary Examiner*—David A. Simmons
*Assistant Examiner*—Robert R. Koehler
*Attorney, Agent, or Firm*—Alan M. Biddison

[57] ABSTRACT

An aluminum alloy composition for sheet product consists essentially of 0.3 to 1.1 wt. % silicon, 0.4 to 1.0 wt. % iron, 0.009 to 0.25 wt. % copper and optionally, minor amounts of manganese, magnesium, chromium, zinc, titanium and other incidental impurities with the balance aluminum. In making aluminum sheet from this composition, the aluminum alloy is continuously cast into an intermediate gauge sheet product and directly cold rolled without an intermediate thermal treatment to final gauge. Optionally, the final gauge sheet product can be subjected to a known temper practice. Using the iron, silicon and copper-containing aluminum alloy composition, a sheet product is produced which has acceptable mechanical properties for use as general purpose aluminum sheet, semi-rigid aluminum container stock, consumer wrap container cutter bars and the like.

10 Claims, 1 Drawing Sheet

GENERAL PURPOSE ALUMINUM ALLOY SHEET COMPOSITION, METHOD OF MAKING AND PRODUCTS THEREFROM

FIELD OF THE INVENTION

The present invention is directed to a general purpose aluminum alloy composition, a method of making sheet from the composition and sheet products, and, in particular, an aluminum alloy composition having effective amounts of silicon, iron and copper which minimize the need for and preferably eliminate intermediate heat treatments during sheet manufacture.

BACKGROUND ART

In the prior art, aluminum alloys such as AA3003, AA3104, AA3107 and AA5052 are extensively used as general and specific purpose sheet products. Exemplary uses for these types of alloys include semi-rigid container stock for poultry roasting pans, frozen dinner trays or the like. Cutter bars typically used in connection with consumer wrap containers are also formed using these types of aluminum alloys.

AA3003 is a preferred alloy for these types of applications because it combines corrosion resistance, strength and formability. However, when using this type of alloy in thin gauge applications such as semi-rigid container stock or general purpose sheet, e.g. 0.035 inches up to 0.125 inches, the alloy must be homogenized between cold rolling steps to achieve the requisite properties at final gauge.

With reference to FIG. 1, a known AA3003 aluminum alloy can be cast by conventional techniques and cold rolled to an intermediate gauge.

Following the cold rolling step to intermediate gauge, the rolled aluminum alloy is subjected to a high temperature thermal or homogenization treatment to principally achieve the proper grain size in the final gauge product. Without this homogenization treatment, the final product will have a non-uniform grain size which adversely effects the mechanical properties and makes the final gauge sheet product unacceptable for commercial use.

Following the cold rolling of the AA3003 to final gauge, a known temper practice such as H19, H24 or 0 temper can be employed to achieve the desired mechanical properties. The treated sheet product can then be fabricated, slit or otherwise formed or shipped for its intended use.

The homogenization treatment between the cold rolling steps described above is typically conducted at high temperatures due to the high manganese content of these types of aluminum alloys. These high temperature homogenization or thermal treatments drastically increase plant operating costs due to fuel consumption in the furnaces. This intermediate anneal also increases handling and manpower costs associated with the sheet product and ultimately increases the final product unit cost.

In view of the disadvantages above, a need has developed to provide an alternative aluminum alloy composition and method of sheet processing which provide acceptable levels of strength and elongation in the final gauge product while reducing energy consumption and operating and unit costs.

In response to this need, the present invention provides both an aluminum alloy composition and method of processing which eliminate the intermediate thermal treatment required with prior art aluminum alloys. The method produces a sheet product having acceptable mechanical properties for use in applications such as semi-rigid container stock, fin stock, general purpose aluminum alloy sheet and consumer wrap cutter bars.

SUMMARY OF THE INVENTION

Accordingly, it is a first object of the present invention to provide an improved aluminum alloy composition which, when processed, yields energy savings while producing a sheet product of acceptable strength and elongation.

A further object of the present invention is to provide a method of making an aluminum alloy sheet that includes elimination of intermediate thermal treatments during cold rolling.

Another object of the invention is to provide a rolled aluminum alloy sheet product for use as cutter bars in consumer wrap containers, fin stock, semi-rigid container stock and general purpose sheet.

Other objects and advantages of the present invention will become apparent as a description thereof proceeds.

In satisfaction of the foregoing objects and advantages, the present invention includes an aluminum alloy composition consisting essentially of the following in weight percent, silicon 0.3–1.1%, iron 0.4–1.0%, copper 0.009–0.25%, manganese 0.10% max, magnesium 0.05% max, chromium 0.05% max, zinc 0.01% max, titanium 0.08% max, with the balance aluminum and incidental impurities. Preferably, the aluminum alloy composition includes from about 0.6 to 0.7% silicon, 0.65 to 0.75% iron and 0.10 to 0.19% copper.

The present invention provides improvements over the conventional method of making aluminum alloy sheet wherein an aluminum alloy is cast to a first intermediate gauge, cold rolled to a second intermediate gauge, homogenized and then cold rolled to final gauge. According to the invention, by providing the inventive aluminum alloy composition above, the aluminum alloy composition can be cast to a first intermediate gauge and directly cold rolled to a final gauge thickness to produce an aluminum alloy sheet product for use as general purpose sheet, fin stock, cutter bars, semi-rigid container stock or the like. Using the inventive process, the cast aluminum alloy can be directly cold rolled to final gauges ranging between 0.0015" and 0,170". The final gauge of the sheet product is selected depending on the desired end use.

Using the inventive method and aluminum alloy composition, a sheet product can be produced of a desired thickness and width which, when given the appropriate tempering treatment, can be utilized in various aluminum alloy sheet applications. In one aspect, the aluminum alloy composition can be cast and directly cold rolled to about 0.009" and formed into a cutter bar for use in consumer wrap containers. In another aspect, the aluminum alloy composition can be cast and directly cold rolled to thicknesses ranging between 0.063" and 0.090" for use as general purpose sheet. For use as semi-rigid container stock and fin stock, the inventive alloy can be cast and directly cold rolled to a foil thickness of about 0.0023" to about 0.0070".

BRIEF DESCRIPTION OF THE DRAWINGS

Reference is now made to the drawings accompanying the invention wherein.

DESCRIPTION OF THE PREFERRED EMBODIMENTS

The present invention offers improvements over prior art aluminum alloy compositions, methods of processing and sheet products made from these methods. According to the invention, using controlled amounts of alloying elements, an aluminum alloy composition can be cast to an intermediate gauge and directly cold rolled to final gauge without the need for thermal treatments such as high temperature homogenization steps or the like.

Figure 1:
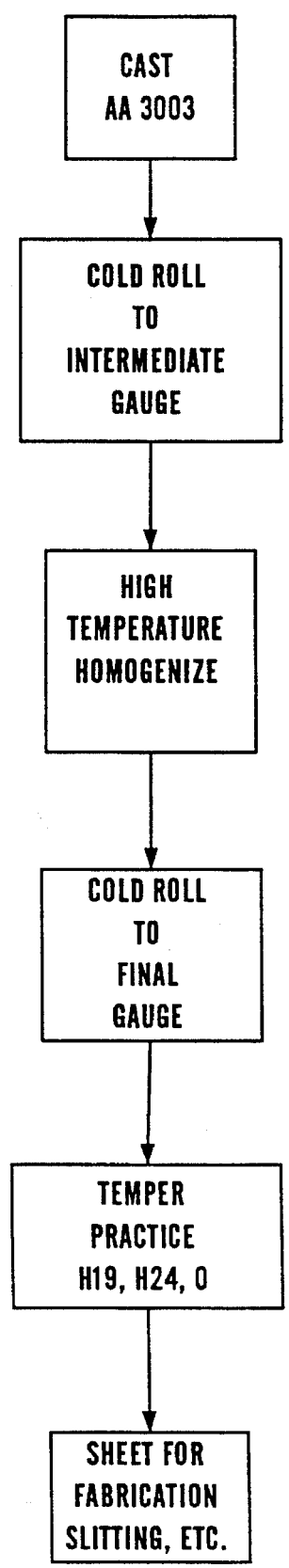
FIG. 1 is a schematic diagram of a prior art method of making AA3003 sheet.
Figure 2:
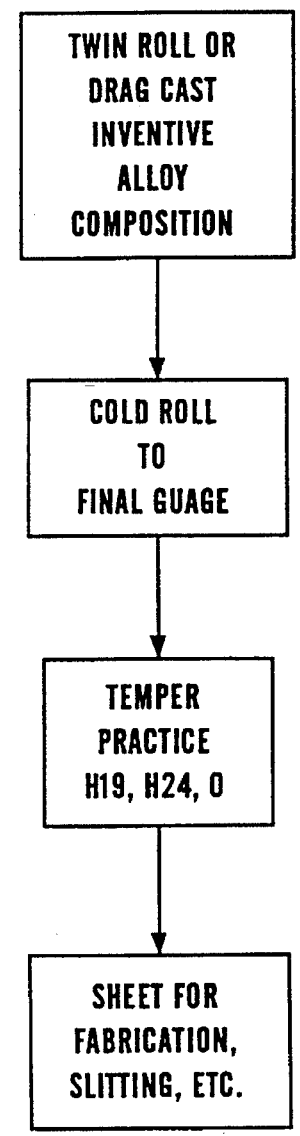
FIG. 2 is a schematic diagram showing one embodiment of the present invention.

According to the invention, with reference to FIG. 2, the inventive alloy composition can be twin roll or drag cast and directly cold rolled to final gauge. After this cold rolling step, the final gauge sheet product can be given a known temper practice such as H19, H24 or 0 temper to obtain desired mechanical properties. The sheet product can then be fabricated, slit, spooled or the like for its intended end use.

The inventive alloy composition identified in FIG. 2 has controlled amounts of iron, silicon and copper which permit casting and direct cold rolling to final gauge without an intermediate thermal treatment or homogenization. The elimination of this intermediate thermal treatment provides high savings in energy and other operating costs, thereby yielding a lower cost sheet product.

As will be demonstrated below, the inventive alloy composition, when cast and directly cold rolled to final gauge, provides a sheet product exhibiting mechanical properties such as tensile strength, yield strength and elongation that are equivalent to prior art alloys using more heat intensive processing.

In its broadest embodiment, the inventive alloy composition consists essentially of an aluminum alloy composition consisting essentially of the following in weight percent, silicon 0.3–1.1%, iron 0.4–1.0%, copper 0.009–0.25%, manganese 0.10% max, magnesium 0.05% max, chromium 0.05% max, zinc 0.01% max, titanium 0.08% max, with the balance aluminum and incidental impurities.

More preferably, the silicon content ranges between 0.6 and 0.7 wt. %, iron ranges 0.65 and 0.75 wt. % and titanium ranges between 0.005 and 0.05 wt. %. In a preferred embodiment, the iron content is greater than the silicon content.

The copper amount preferably ranges between 0.10 and 0.19 wt. % and more preferably, 0.14 to 0.18 wt. %.

It is believed that copper in excess of 0.25 wt. % results in excessive work hardening during the cold rolling step. Copper amounts below the lower limit of 0.009% are insufficient to attain the mechanical properties necessary at the desired final gauge thicknesses.

In the inventive composition, impurities are limited to 0.05 wt. % max each, the total impurities being less than 0.15 wt. %.

In its broadest embodiment, the inventive alloy described above is cast and cold rolled directly to a desired final gauge. Casting is preferably done using twin roll casting. Typically, the aluminum alloy is cast to a thickness range of 0.300" to 0.425" with a 0.40" target, in widths up to 80".

Alternatively, drag casting, as disclosed in U.S. Pat. No. 4,828,012 to Honeycutt, III et al., herein incorporated in its entirety by reference, can be employed to cast the inventive alloy composition to the cast thicknesses described above.

The cold rolling of the cast alloy can be done using any known cold rolling mills, including gap mills, tandem sheet mills and/or foil mills. Since these types of mills are conventional in making aluminum alloy sheet product, further description is not deemed necessary for understanding of the invention.

Following the cold rolling step, and depending on the final sheet gauge and desired application, the cold rolled sheet can be utilized without any thermal treatment, i.e. an H19 temper. Alternatively, the sheet product can be given any known thermal treatment for aluminum alloy sheet product. Examples of these treatments include an H24 temper or a 0 temper. In the H24 temper, the cold rolled sheet is heated to around 450° F. to 480° F. and cooled over an extended time period, e.g. 24 to 30 hours.

In a 0 temper, the material is heated at higher temperatures, for example, 680° F. to 720° F. and cooled, the total processing time extending up to 35 hours.

It should be understood that the tempers described above are exemplary and other known aluminum heat treatments can be utilized with the sheet product process according the inventive method.

Once the sheet product is given its appropriate temper, it can be processed in conjunction with its desired end use. For example, the sheet product can be fabricated into roaster trays for cooking turkeys or into frozen food trays. Alternatively, the inventive alloy composition and process can be used to make general purpose sheet in thicknesses such as 0.063", 0.090" and 0.125". Typically, this sheet product is stress relief annealed at temperatures ranging between 400° and 500° F. for a predetermined period of time, preferably about 4 hours.

When using the inventive sheet product for cutter bar use, the inventive alloy can be cast at the target value specified above, direct rolled to 0.009" and given an H19 temper.

In order to demonstrate the unexpected and surprising results of achieving mechanical properties equivalent to known prior art sheet products without an intermediate thermal treatment, the following compares the inventive alloy composition with prior art AA3003 and AA3104 alloys.

It should be understood that the embodiments discussed below are not to be considered as limiting with respect to the scope of the invention.

In Table I below, tensile strength, yield strength and percent elongation are compared between a prior art AA3003 alloy and the inventive composition.

TABLE I

MECHANICAL PROPERTIES BETWEEN AA3003 AND INV. ALLOY

| Core | Thermal Practice | TS (KSI) | YS (KSI) | % EL |
|---|---|---|---|---|
| 3003 | .420" cold roll to .250" Homo 6 hr @ 1000° F. Cold roll to .060" Anneal 2 hr. 675° F. | 15.5 | 6.7 | 32.2 |
| Alloy A* | .390" Cold roll to .060" Anneal 2 hr 675° F. | 17.5 | 8.0 | 29.0 |

*Inventive alloy composition Si .61, Fe .72, Cu .14, Mn .01, Mg < .01, Cr < .01, Ni < .01, Zn < .01, Ti < .01 (wt. %'s)

As can be seen from this table, the inventive alloy, designated as Alloy A has at least the mechanical properties of the AA3003 alloy. In this comparison, the Alloy A is twin roll cast to a thickness of 0.390", directly cold rolled to a final gauge of 0.060" and given an anneal of two hours at 675° F.

In contrast, the AA3003 alloy is twin roll cast to a thickness of 0.420", cold rolled to an intermediate gauge of 0.250" homogenized at 1,000° F. for six hours, final cold rolled to a final gauge of 0.060" and given an anneal at 675° F. for two hours.

Table I demonstrates that equivalent mechanical properties can be achieved using the inventive alloy composition by directly cold rolling the cast alloy to a final gauge.

TABLE II

| CUTTER BAR ALLOY COMPARISON | | | | |
|---|---|---|---|---|
| ALLOY | GAUGE | TS (KSI) | YS (KSI) | % EL |
| ALLOY B | .0086" | 38.4 | 34.5 | 5.5 |
| ALLOY C | .0088" | 41.0 | 37.2 | 4.0 |
| 3104-H34* | .009" | 35.0 | 32.0 | 2.0 |

*Properties are minimum requirements

Table II compares Alloys B and C to a cutter bar 3104 having an H34 temper. Alloy B is similar to Alloy A but has 0.10 wt.% Cu. Likewise Alloy C is similar to Alloy A but has 0.19 wt.% Cu. Alloys B and C were twin roll cast and directly cold rolled to final gauge. The AA3104 alloy, used in prior art cutter bar applications, had a high temperature thermal prior to cold rolling to final gauge. The inventive Alloys B and C use an H19 temper practice. As can be seen from Table II, casting either inventive Alloy B or C and directly cold rolling to the final gauge of approximately 0.009" yields tensile strength, yield strength and percent elongation meeting the minimum requirements for cutter bar use.

This comparison again demonstrates that processing the inventive alloy by casting and direct cold rolling to gauge without an intermediate anneal yields a sheet product which can be utilized as a cutter bar while having a lower product unit cost.

TABLE III

| GENERAL PURPOSE SHEET COMPARISON | | | | |
|---|---|---|---|---|
| ALLOY | GAUGE | TS (KSI) | YS (KSI) | % EL |
| AA3003** H14 Temper | .063"–.125" | 20–26 | ≧17 | ≧2.0 |
| ALLOY D* | .125" | 24.1 | 21.4 | 11.8 |
| ALLOY D* | .090" | 23.8 | 20.8 | 12.5 |
| ALLOY D* | .063" | 23.7 | 20.4 | 13.5 |

*Si .63, Fe. 67, Cu. 13 (wt. %)
**target properties

With reference now to Table III, a comparison is shown between AA3003 and another embodiment of the inventive alloy for general purpose sheet. In this table, the inventive Alloy D is twin roll cast and rolled directly to either 0.063", 0.090" or 0.125" and stress relieved at 500° F. for a predetermined period of time to obtain the properties required for general purpose sheet. As can be seen from Table III, Alloy D provides tensile strength, yield strength and elongation meeting the required general purpose sheet properties of an AA3003 H14 temper sheet.

It has also been discovered that the continuous casting of the inventive alloy provides more consistent mechanical properties at final gauge than prior art alloys which are subjected to intermediate thermal treatment.

In the prior art practice of intermediate thermal treatments, particularly AA3003 alloys, the material is heated in increments which results in variations or inconsistencies in the thermally treated material. Due to these inconsistencies formed during intermediate thermal treatment, stress relief curves must be developed for the intermediate anneal treated material since a stress relieving practice for one sheet product may not give the same results for another sheet.

In contrast, the present invention, by eliminating the intermediate thermal treatment, also eliminates the need to develop stress relieving curves for the cold rolled material. Since the cast material is only subjected to cold rolling, which provides a consistent structure in the final gauge product, all of the directly cold rolled sheets can be subjected to a similar stress relief processing. This consistency in stress relief annealing eliminates the need to develop a number of stress relief curves and also contributes to reductions in operating and product unit costs.

The inventive aluminum alloy composition also provides advantages over AA3003 through higher continuous casting output and improved recyclability. The alloy of the invention can be cast at higher speeds, e.g. 2.8 ft/min vs. 2.5 ft/min (AA3003). Moreover, the inventive alloy is more recyclable with other grades such as AA8111 due to its lower manganese content. Alloys such as AA3003 with high manganese levels cause problems if recycled with sheet alloy material of low manganese content such as AA8111.

As such, an invention has been disclosed in terms of preferred embodiments thereof which fulfill each and every one of the objects of the present invention as set forth hereinabove and provides a new and improved aluminum alloy composition, method of making sheet product and sheet products therefrom.

Of course, various changes, modifications and alterations from the teachings of the present invention may be contemplated by those skilled in the art without departing from the intended spirit and scope thereof. Accordingly, it is intended that the present invention only be limited by the terms of the appended claims.

What is claimed is:

1. A method of making aluminum alloy sheet product comprising:

a) providing an aluminum alloy for casting consisting essentially of the following in weight percent:

| | |
|---|---|
| silicon | 0.3–1.1% |
| iron | 0.4–1.0% |
| copper | 0.009–0.25% |
| manganese | .10% max |
| titanium | .08% max | with the balance aluminum and incidental impurities;

b) twin roll casting the aluminum alloy of step (a) to provide a cast first intermediate gauge product; and c) directly cold rolling said cast aluminum alloy from said first intermediate gauge to said final gauge to produce said sheet product.

2. The method of claim 1 wherein said copper is between 0.10 and 0.19%.

3. The method of claim 2 wherein said copper is between 0.14 and 0.18%.

4. The method of claim 1 wherein said final gauge is between 0.0015 and 0.170 inches.

5. The method of claim 1 wherein said sheet product is annealed between 675° and 725° F.

6. The method of claim 1 wherein said cast aluminum alloy is directly cold rolled to a final gauge between 0.063 and 0.090 inches and stress relief annealed.

7. The method of claim 1 wherein said cast aluminum alloy is directly cold rolled to about 0.009 inches and directly formed into a cutter bar without heat treatment for use in consumer wrap containers.

8. The method of claim 1 wherein said sheet product is a general purpose sheet product.

9. A method of making a general purpose aluminum alloy sheet product comprising:

a) providing an aluminum alloy for casting consisting essentially of the following in weight percent:

| | |
|---|---|
| silicon | 0.3–1.1% |
| iron | 0.4–1.0% |
| copper | 0.009–0.25% |
| manganese | .10% max |
| magnesium | .05% max |
| chromium | .05% max |
| zinc | .01% max |
| titanium | .08% max | with the balance aluminum and incidental impurities;

b) twin roll casting the aluminum alloy of step (a) to provide a cast first intermediate gauge product; and c) directly cold rolling said cast aluminum alloy from said first intermediate gauge to said final gauge to produce said general purpose sheet product.

10. A method of making aluminum semi-rigid container stock comprising:

a) providing a molten aluminum alloy consisting essentially of the following in weight percent:

| | |
|---|---|
| silicon | 0.3–1.1% |
| iron | 0.4–1.0% |
| copper | 0.009–0.25% |
| manganese | .10% max |
| magnesium | .05% max |
| chromium | .05% max |
| zinc | .01% max |
| titanium | .08% max | with the balance aluminum and incidental impurities;

b) twin roll continuously casting said molten aluminum alloy to provide an intermediate gauge product; and c) directly cold rolling said intermediate gauge product to a final gauge to thereby make semi-rigid container stock.

\* \* \* \* \*